US008693384B2

(12) United States Patent
Wu (10) Patent No.: US 8,693,384 B2
(45) Date of Patent: Apr. 8, 2014

(54) METHOD FOR DYNAMIC PACKET RETRANSMISSION FOR RADIO LINK CONTROL LAYER IN A WIRELESS COMMUNICATIONS SYSTEM

(75) Inventor: Chih-Hsiang Wu, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 931 days.

(21) Appl. No.: 12/128,636

(22) Filed: May 29, 2008

(65) Prior Publication Data

US 2009/0296625 A1    Dec. 3, 2009

(51) Int. Cl.
*H04B 7/14* (2006.01)

(52) U.S. Cl.
USPC .......................................................... 370/315

(58) Field of Classification Search
USPC .................. 370/315, 392, 474, 475
See application file for complete search history.

(56) References Cited

U.S. PATENT DOCUMENTS

| 6,307,867 | B1 * | 10/2001 | Roobol et al. | 370/470 |
|---|---|---|---|---|
| 6,850,508 | B1 | 2/2005 | Chang | |
| 2001/0033582 | A1 * | 10/2001 | Sarkkinen et al. | 370/474 |
| 2005/0135291 | A1 * | 6/2005 | Ketchum et al. | 370/319 |
| 2005/0281243 | A1 | 12/2005 | Horn | |
| 2007/0253447 | A1 * | 11/2007 | Jiang | 370/474 |
| 2008/0165805 | A1 * | 7/2008 | Terry et al. | 370/474 |
| 2009/0161571 | A1 * | 6/2009 | Terry et al. | 370/252 |

FOREIGN PATENT DOCUMENTS

| CA | 2 650 725 A1 | 11/2007 |
|---|---|---|
| CN | 1946015 A | 4/2007 |
| EP | 1 717 981 A1 | 11/2006 |
| EP | 2 015 496 A1 | 1/2009 |
| WO | 2007129626 A1 | 11/2007 |

OTHER PUBLICATIONS

Office Action mailed on Aug. 24, 2012, for the China application No. 200910142701.8, filing date May 31, 2009, p. 1-14.
Office action mailed on Sep. 5, 2013 for the Taiwan application No. 098117656, filing date May 27, 2009, p. 1-12.

* cited by examiner

*Primary Examiner* — Mark Rinehart
*Assistant Examiner* — Mohammad Anwar
(74) *Attorney, Agent, or Firm* — Winston Hsu; Scott Margo (57) ABSTRACT

The present invention discloses a method for dynamic packet retransmissions of a radio link control, hereinafter called RLC, layer for an RLC entity of a transmitter in a wireless communications system. The method includes the following steps. A first RLC packet, including a first header and a first data field, is transmitted to a receiver. A negative acknowledgment signal corresponding to the first RLC packet is received from the receiver. A first TB size is indicated and received from a protocol layer lower than the RLC layer. A second RLC packet is constructed, whose size depends on the first TB size, includes a second header and a second data field including a portion of the first data field. The second RLC packet is then transmitted to the receiver.

21 Claims, 8 Drawing Sheets

METHOD FOR DYNAMIC PACKET RETRANSMISSION FOR RADIO LINK CONTROL LAYER IN A WIRELESS COMMUNICATIONS SYSTEM

BACKGROUND OF THE INVENTION

1. Field of the Invention

The present invention relates to a method for retransmission, and more particularly, to a method for dynamic packet retransmission of a radio link control (RLC) layer for a wireless communications system.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipment (UE).

A radio link control (RLC) layer is responsible for data transfer of radio bearers from an upper layer, radio resource control (RRC) layer, and includes three transfer modes of Transparent Mode (TM), Unacknowledged Mode (UM) and Acknowledged Mode (AM). In the LTE system, an AM RLC entity, either in the E-UTRAN or in the UE, consists of a transmitting side and a receiving side and supports segmentation, retransmission, sequence check and other functions. The transmitting side of the AM RLC entity receives RLC service data units (SDUs) from upper layers and delivers RLC protocol data units (PDUs) to its peer AM RLC entity according to a transport block (TB) size indicated by a lower layer. The receiving side of the AM RLC entity delivers RLC SDUs to the upper layers and receives RLC PDUs from its peer AM RLC entity via the lower layer.

Due to a dynamic nature of the TB size, the LTE system supports the variable size for the RLC PDUs and RLC PDU re-segmentation. The current standard only considers re-segmentation for the retransmission when an RLC PDU to be retransmitted cannot fit the TB size indicated by the lower layer. The re-segmentation level is not limited, i.e. an RLC PDU segment can be segmented again for retransmission if it cannot fit the indicated TB size. A specific example refers to a document: 3GPP TSG-RAN WG2#59 R2-073535.

The RLC PDU segments are retransmitted if they are negatively acknowledged. For example, if a first RLC PDU segment is negatively acknowledged and the TB size for retransmission can afford the first RLC PDU segment, the first RLC PDU segment is submitted to the lower layers without re-segmentation. When two or more consecutive RLC PDU segments are negatively acknowledged, the simplest way is to retransmit them with the same format as previous transmission. This way is not efficient to utilize radio resources as illustrated by examples below.

Figure 1:
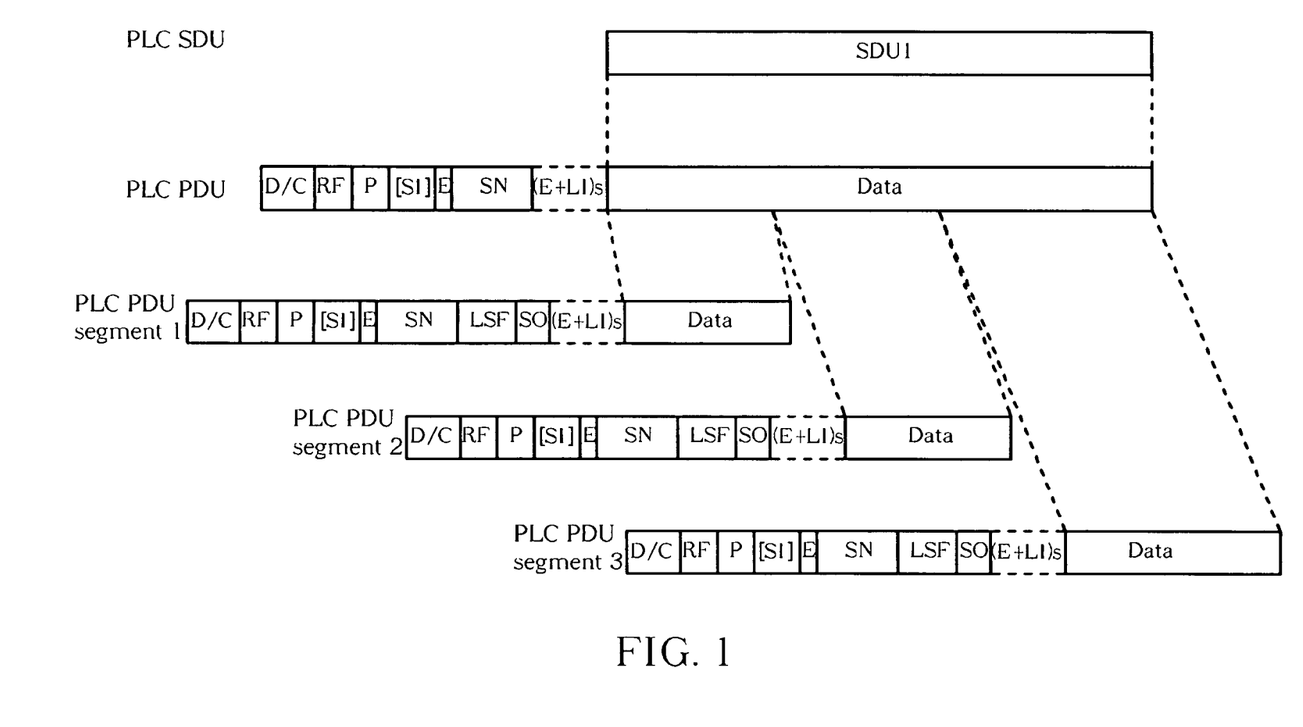
FIGS. 1-3 are schematic diagrams of RLC packets corresponding to retransmission according to the prior art.

Please refer to FIG. 1, which is a schematic diagram of RLC packets corresponding to retransmission according to the prior art. In FIG. 1, an RLC PDU consists of a header and a data field, and the data field is an RLC SDU. The RLC PDU is segmented into RLC PDU segments 1, 2 and 3 transmitted by a transmitter, which could be the UE or E-UTRAN. The header includes a D/C, an RF, a P, an SI, an E, an SN and a (E+LI)s fields. The definition of the fields are well known in the art and the detailed descriptions are omitted here.

For the first example, the RLC PDU segments 1 and 2 are negatively acknowledged, while the RLC PDU segment 3 is positively acknowledged. The transmitter has to retransmit the RLC PDU segments 1 and 2. At a transmission time interval (TTI) for retransmission, a TB size indicated from lower layers cannot afford the RLC PDU segments 1 and 2, but can afford the whole RLC PDU segment 1 plus data of the RLC PDU segment 2. In this case, only the RLC PDU segment 1 is retransmitted at the TTI, whereas the RLC PDU segment 2 has to be retransmitted at the next coming TTI. Thus, radio resources cannot be fully utilized for data transmission.

Please continue to refer to FIG. 1 for the second example. The RLC PDU segments 1, 2 and 3 are transmitted and all the RLC PDU segments 1, 2 and 3 are negatively acknowledged. The transmitter has to retransmit the RLC PDU segments 1, 2 and 3. At a TTI for retransmission, the TB size cannot afford the three RLC PDU segments but can afford the whole RLC PDU or the RLC PDU segment 1 plus the RLC PDU segment 2. In this case, only RLC PDU segments 1 and 2 are retransmitted, and the RLC PDU segment 3 has to be retransmitted at the next coming TTI. Radio resources cannot be fully utilized for data transmission as well.

Figure 2:
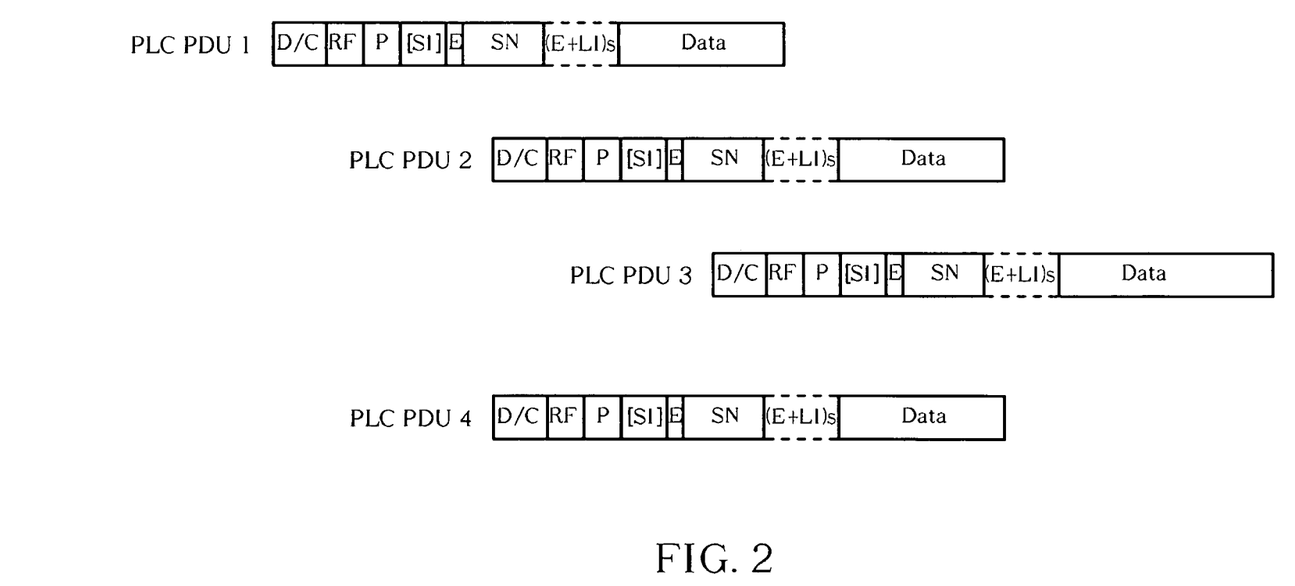

Please refer to FIG. 2, which is a schematic diagram of RLC packets corresponding to retransmission according to the prior art. For the third example, the RLC PDUs 1, 2 and 3 are transmitted to the receiver, whereas the RLC PDU 4 is a new PDU that has not been transmitted to the receiver yet. The RLC PDUs 1 and 2 are negatively acknowledged, while the RLC PDU 3 is positively acknowledged. The transmitter has to retransmit the RLC PDUs 1 and 2. At a TTI for retransmission, the TB size cannot afford the RLC PDUs 1 and 2 but can afford the RLC PDU 1 plus partial data of the RLC PDU 2. In this case, only the RLC PDU 1 is retransmitted, and the RLC PDU 2 has to be retransmitted at the next coming TTI. Radio resources cannot be fully utilized for data transmission as well.

Please continue to refer to FIG. 2 for the fourth example. The RLC PDUs 1, 2 and 3 shown in FIG. 2 are transmitted. The RLC PDUs 1 and 2 include data of 500 and 100 bytes, respectively. The RLC PDUs 1 and 2 are negatively acknowledged, while the RLC PDU 3 is positively acknowledged. The transmitter has to retransmit the RLC PDUs 1 and 2. At a TTI for retransmission, the TB size is allocated with 100 bytes for data, indicated from the lower layers. In this situation, the RLC PDU 1 needs to be segmented. As well known in the art, the header of an RLC PDU segment includes two extra fields of SO and LSF, represented by a total 2 bytes. Thus, the SO and LSF fields occupy 2 bytes of 100 bytes and only 98 bytes of are used for the data of the RLC PDU 1 at the TTI. If a TB size at the next TTI is allocated with 500 bytes for data, the transmitter transmits 404 bytes, which includes 402 bytes for the remaining data of the RLC PDU 1 and 2 bytes for the SO and LSF fields, and 96 bytes for data of the RLC PDU 2. The RLC PDU 2 is segmented as well, and the remaining 4-byte data has to wait for the next transmission.

Figure 3:
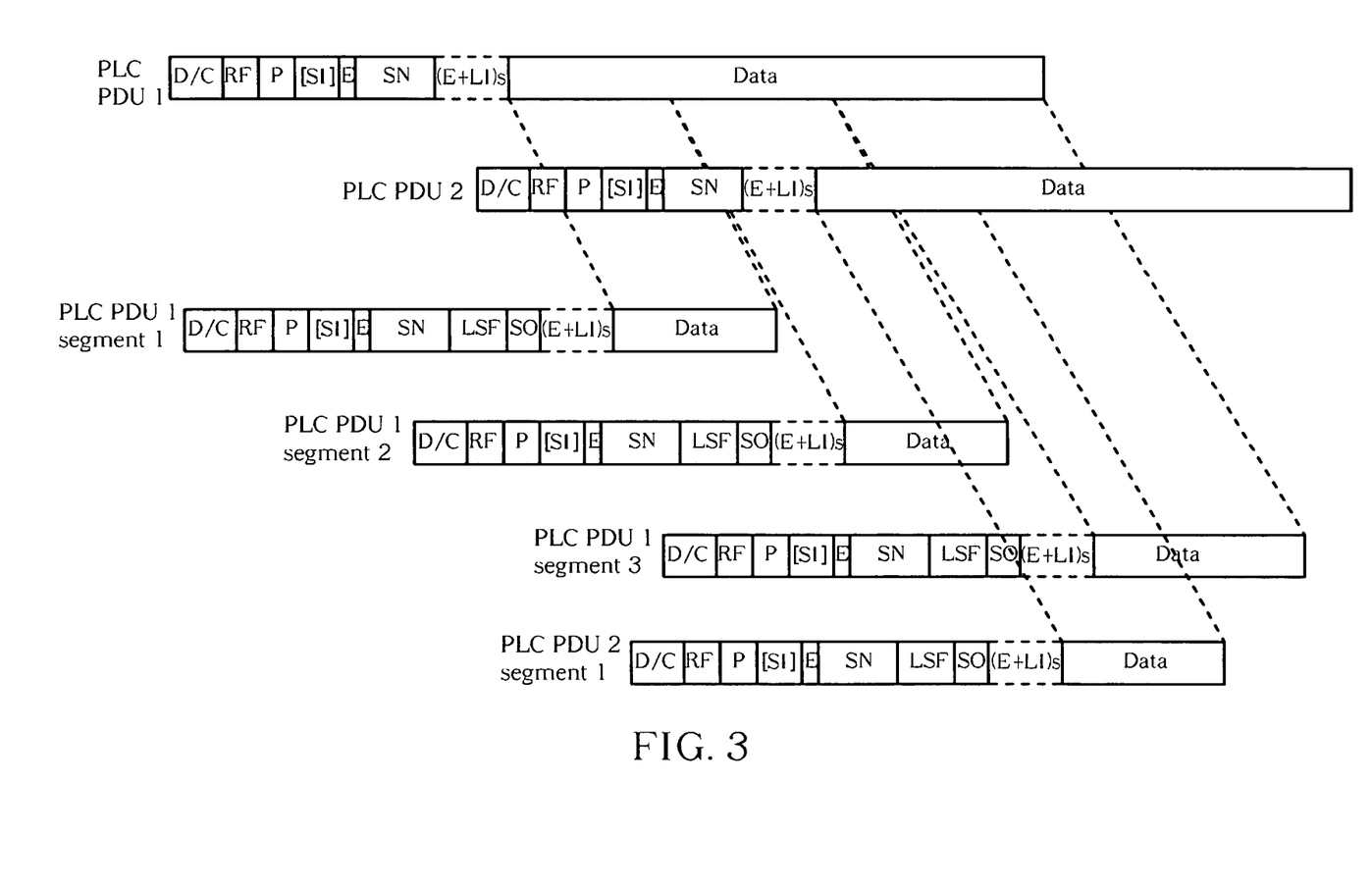

Please refer to FIG. 3, which is a schematic diagram of RLC packets corresponding to retransmission according to the fifth example of the prior art. The RLC PDUs 1 and 2 are transmitted and negatively acknowledged. The RLC PDU 1 is retransmitted with RLC PDU 1 segments 1, 2 and 3. In the transmission opportunity for the RLC PDU 1 segment 3, the TB size provides a greater capacity than the size of the RLC PDU 1 segment 3. In this situation, the RLC PDU 2 are segmented. The RLC PDU 1 segment 3 and the RLC PDU 2 segment 1 are then retransmitted together at this TTI, thereby wasting the radio resources due to one RLC PDU segment header needed for RLC PDU 2 segment 1.

SUMMARY OF THE INVENTION

It is therefore an objective of the present invention to provide methods for an RLC entity of a transmitter in a wireless communications system to fully utilize the radio resources for dynamic packet retransmissions or reduce time for retransmission of packet data.

The present invention discloses a method for dynamic packet retransmissions of a RLC layer for an RLC entity of a transmitter in a wireless communications system. The method includes the following steps. A first RLC packet, including a first header and a first data field, is transmitted to a receiver. A negative acknowledgment signal corresponding to the first RLC packet is received from the receiver. A first TB size is indicated and received from a protocol layer lower than the RLC layer. A second RLC packet is constructed, whose size depends on the first TB size, includes a second header and a second data field including a portion of the first data field. The second RLC packet is then transmitted to the receiver. The size of the second RLC packet is preferred to fit the first TB size.

The present invention further discloses a method or dynamic packet retransmissions of a RLC layer for an RLC entity of a transmitter in a wireless communications system. The method includes the following steps. A plurality of RLC packets are transmitted to a receiver. A negative acknowledgment signal corresponding to the plurality of RLC packets is received from the receiver. A TB size is indicated and received from a protocol layer lower than the RLC layer. A first RLC packet, whose packet size mostly fits the transport block size, is selected from the plurality of RLC packets. The first RLC packet is then transmitted to the receiver in a transmission opportunity.

These and other objectives of the present invention will no doubt become obvious to those of ordinary skill in the art after reading the following detailed description of the preferred embodiment that is illustrated in the various figures and drawings.

DETAILED DESCRIPTION

Figure 4:
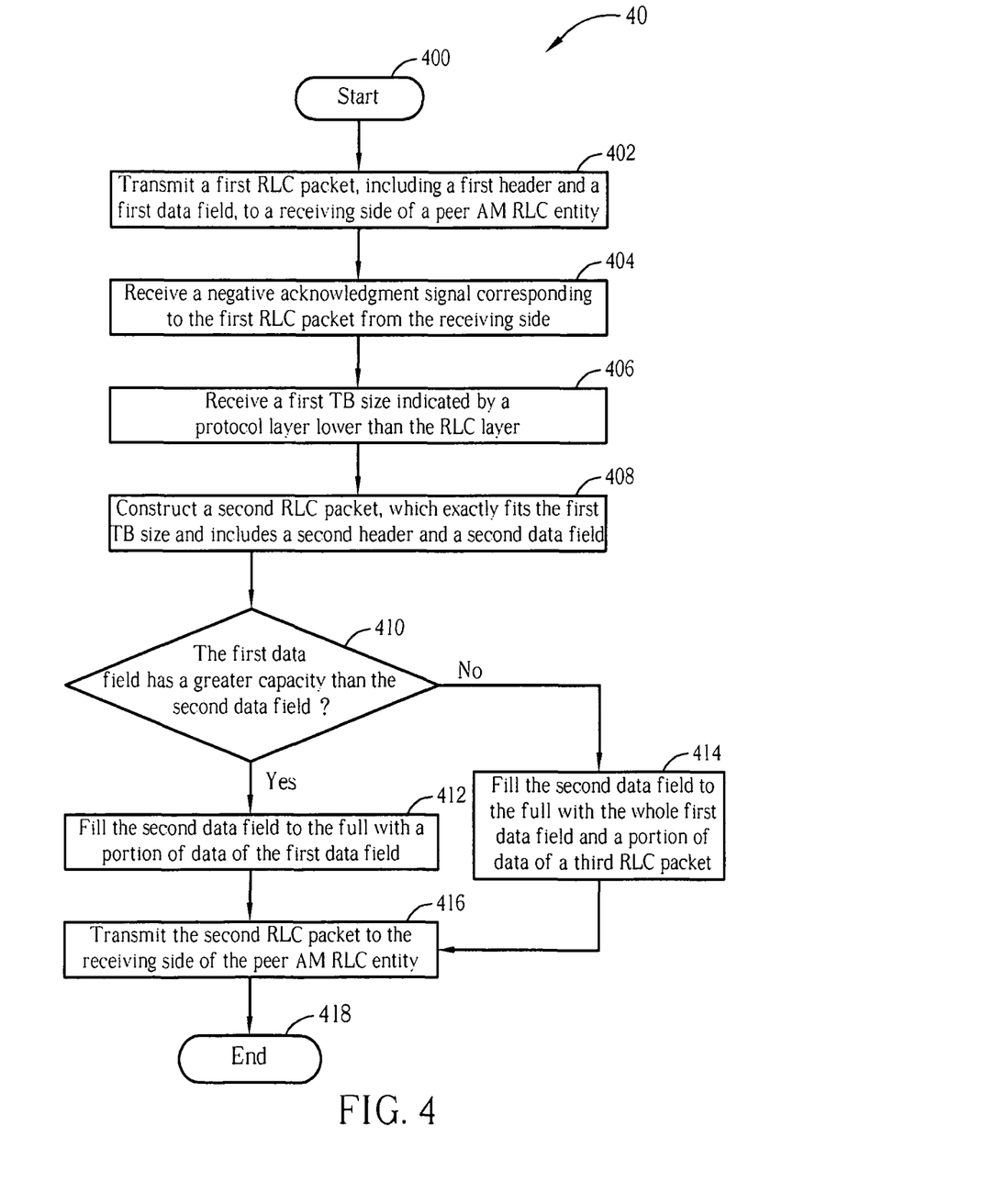
FIG. 4 illustrates a flowchart of a process for a transmitting side of an AM RLC entity according to an embodiment of the present invention.

Please refer to FIG. 4, which illustrates a flowchart of a process 40 for a transmitting side of an AM RLC entity according to an embodiment of the present invention. The AM RLC entity can be installed in an E-UTRAN, an eNB or a UE. The process 40 is used for dynamic packet retransmissions in an RLC layer and includes the following steps:

Step 400: Start.

Step 402: Transmit a first RLC packet, including a first header and a first data field, to a receiving side of a peer AM RLC entity.

Step 404: Receive a negative acknowledgment signal corresponding to the first RLC packet from the receiving side.

Step 406: Receive a first transport block (TB) size indicated by a protocol layer lower than the RLC layer.

Step 408: Construct a second RLC packet, whose packet size according to the first TB size, where the second RLC packet includes a second header and a second data field.

Step 410: Determine if the first data field has a greater capacity than the second data field or not; if so, execute Step 412; if not, execute Step 414.

Step 412: Fill the second data field to the full with a portion of data of the first data field and then execute Step 416.

Step 414: Fill the second data field to the full with whole data of the first data field and a portion of data of a third RLC packet and then execute Step 416.

Step 416: Transmit the second RLC packet to the receiving side of the peer AM RLC entity.

Step 418: End.

According to the process 40, the transmitting side of the AM RLC entity firstly transmits the first RLC packet to the peer AM RLC entity, and then the peer AM RLC entity negatively acknowledges the first RLC packet. As a result, the data of the first RLC packet needs to be retransmitted. In a retransmission opportunity, the first TB size is indicated by a lower layer, providing a maximum data allowance. In this situation, the second RLC packet is constructed according to the first TB size and then transmitted to the peer AM RLC entity. Preferably, the second RLC packet is constructed to fit the first TB size. This also means that the data load of the second data field exactly fits the maximum data allowance, thereby fully utilizing radio resources. The data content of the second data field is different, depended on a capacity of the second data field. If the first data field has a greater capacity than the second data field, the data content of the second data field only includes partial data of the first data field; otherwise, the data content includes not only the entire first data field but also partial data of the third RLC packet, which is preferably concatenated to the first data field. The third RLC packet could be a packet that is negatively acknowledged or has not be transmitted to the peer AM RLC entity yet. Through the process 40, an RLC packet is constructed according to the TB size for retransmission and thereby no radio resource is wasted.

Figure 5:
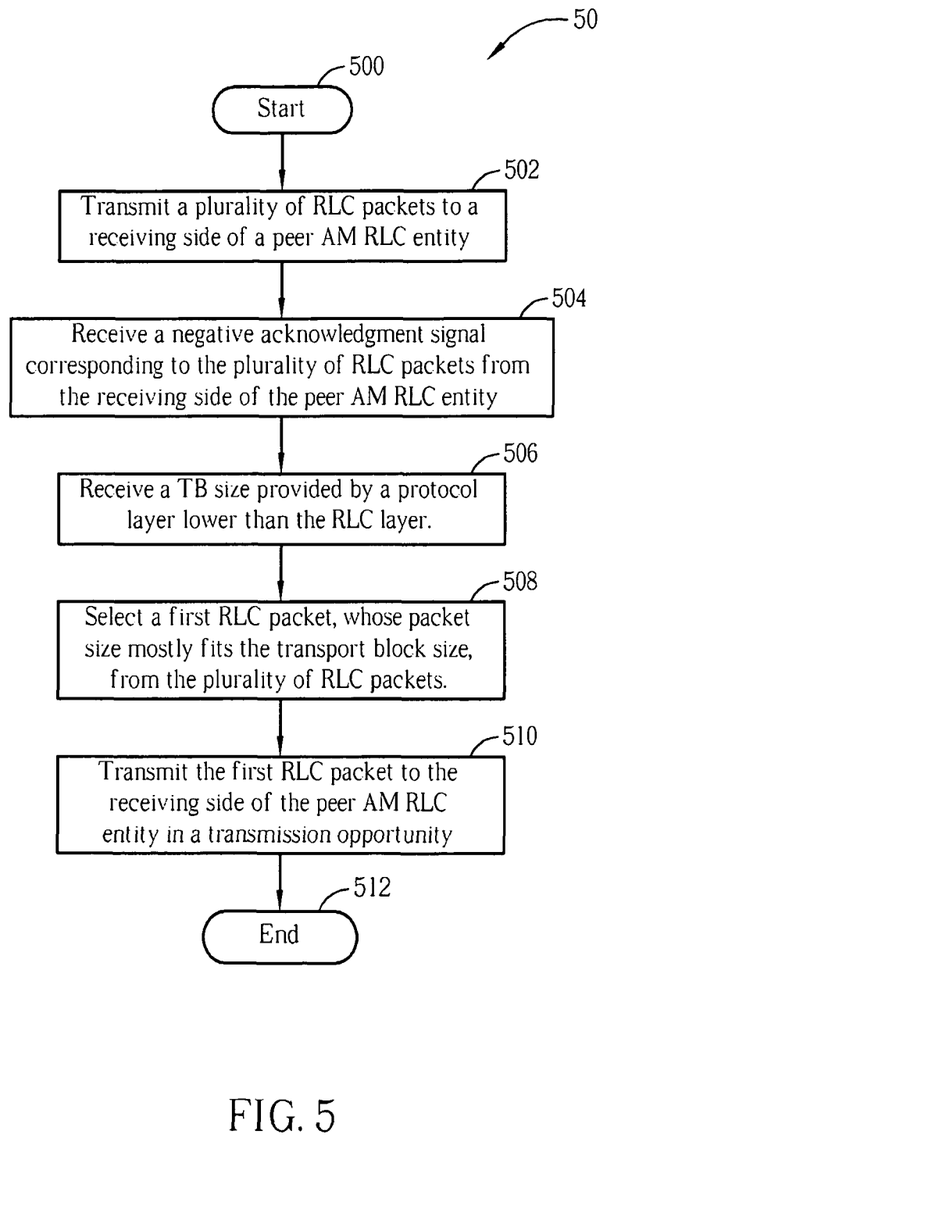
FIG. 5 illustrates a flowchart of a process for a transmitting side of an AM RLC entity according to an embodiment of the present invention.

Please refer to FIG. 5, which illustrates a flowchart of a process 50 for a transmitting side of an AM RLC entity according to an embodiment of the present invention. The AM RLC entity can be installed in an E-UTRAN, an eNB or a UE. The process 50 is used for dynamic packet retransmissions in an RLC layer and includes the following steps:

Step 500: Start.

Step 502: Transmit a plurality of RLC packets to a receiving side of a peer AM RLC entity.

Step 504: Receive a negative acknowledgment signal corresponding to the plurality of RLC packets from the receiving side of the peer AM RLC entity.

Step 506: Receive a TB size provided by a protocol layer lower than the RLC layer.

Step 508: Select a first RLC packet, whose packet size mostly fits the transport block size, from the plurality of RLC packets.

Step 510: Transmit the first RLC packet to the receiving side of the peer AM RLC entity in a transmission opportunity.

Step 512: End.

According to the process 50, the plurality of RLC packets may be RLC PDUs or RLC PDUs segments. When the plurality of RLC packets are transmitted and then negatively acknowledged by the peer AM RLC entity, data of the RLC packets needs to be retransmitted. At a transmission opportunity for retransmission, the TB size is provided by the lower layer. The transmission opportunity is preferably a transmission time interval (TTI). According to the TB size, the first RLC packets are selected from the plurality of RLC packets because the first RLC packet mostly fits the TB size. If the TB size has remaining space and a second RLC packet from the plurality of RLC packets mostly fits the remaining space, the second RLC packet is selected. The same step is repeated until the remaining space of the TB size cannot accommodate any one of the plurality of RLC packets. Through the process 50, the radio resources are utilized as much as possible.

Please note that the processes 40 and 50 operating in AM are just embodiments. The scope of the present invention is not limited to AM. Therefore, the processes 40 and 50 can be used in RLC transmission modes where a TB size is also provided.

For explaining the scope of the present invention more clearly, several embodiments of the present invention are described below and make improvements upon the prior art. For convenience, the same reference numbers will be used in the following embodiment of the present invention as those used in corresponding example of the prior art. Beside, the embodiments are applied to the UE, eNB or E-UTRAN of the LTE system.

Figure 6:
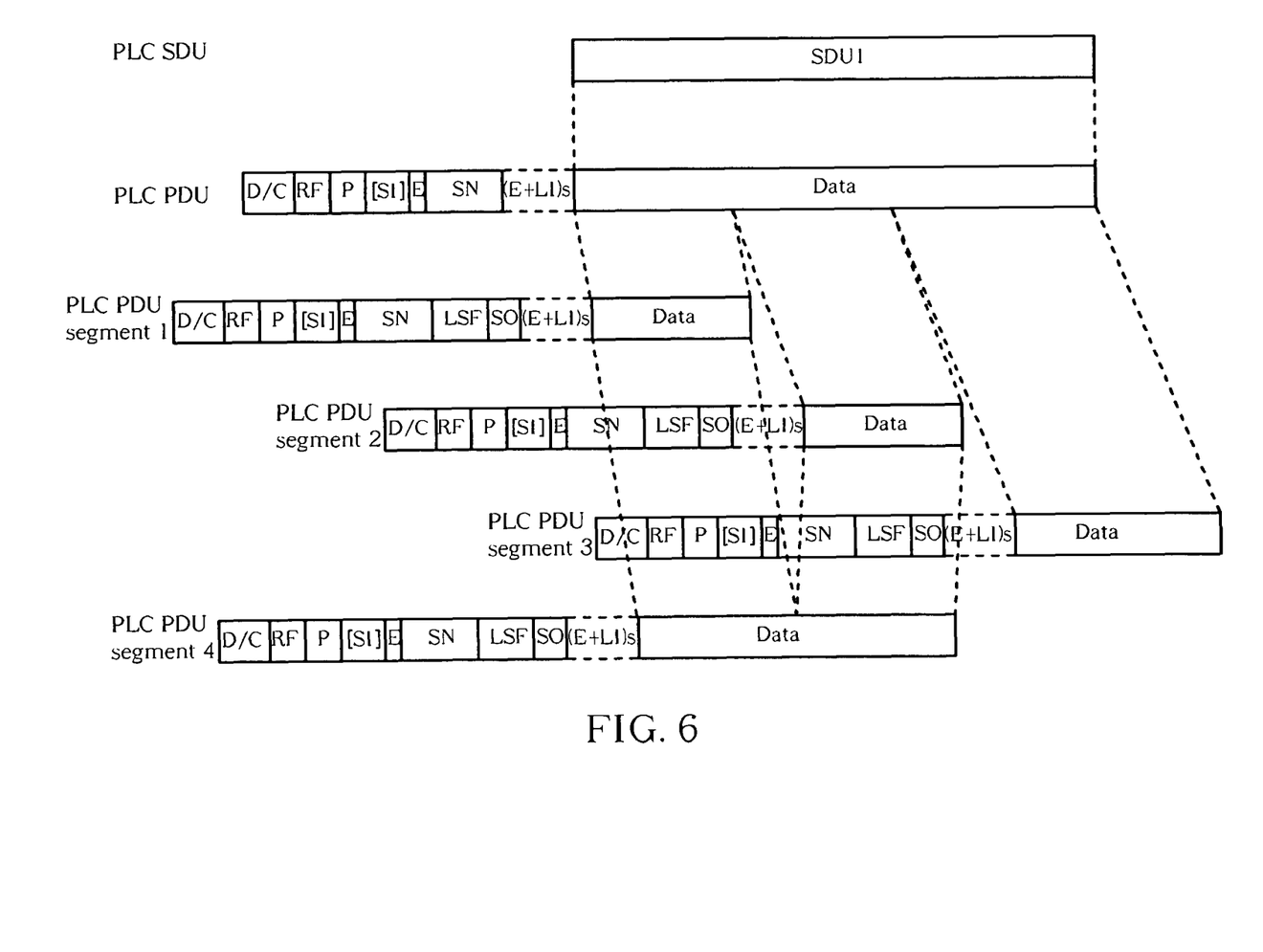
FIGS. 6-8 are schematic diagrams of RLC packets corresponding to retransmission according to embodiments of the present invention.

Please refer to FIG. 6, which illustrates a schematic diagram of RLC packets corresponding to retransmission according to an embodiment of the present invention. FIG. 6 is the embodiment making an improvement upon the first example of the prior art corresponding to FIG. 1. The RLC PDU segments 1, 2 and 3 of the RLC PDU are transmitted. The RLC PDU segments 1 and 2 are negatively acknowledged and therefore the data thereof needs to be retransmitted. At the TTI for retransmission, the TB size indicated from the lower layer can afford the whole RLC PDU segment 1 plus data of the RLC PDU segment 2. In this situation, instead of retransmitting RLC PDU segments 1 and 2 with two TTIs, an RLC PDU segment 4 used for retransmission is constructed according to the TB size to save a transmission payload of the header of the RLC PDU segment 2. Preferably, the RLC PDU segment 4 fits the TB size. In addition, a data field of RLC PDU segment 4 includes the data of RLC PDU segment 1 and data of RLC PDU segment 2. When the receiver successfully receives the RLC PDU segment 4, it can construct the RLC PDU just from the RLC PDU segments 3 and 4. Therefore, not only the radio resources are fully utilized but also time for retransmission of the RLC PDU segment 2 is reduced.

In this paragraph, an embodiment of the present invention is provided to make an improvement upon the second example of the prior art, in which the RLC PDU segments 1, 2 and 3 are the whole segments of the RLC PDU and negatively acknowledged. At the TTI for retransmission, the indicated TB size can afford the whole RLC PDU. In this situation, the second embodiment directly retransmits the RLC PDU. Thus, the radio resources are fully utilized, and time for retransmission of the RLC PDU segment 3 is reduced.

Figure 7:
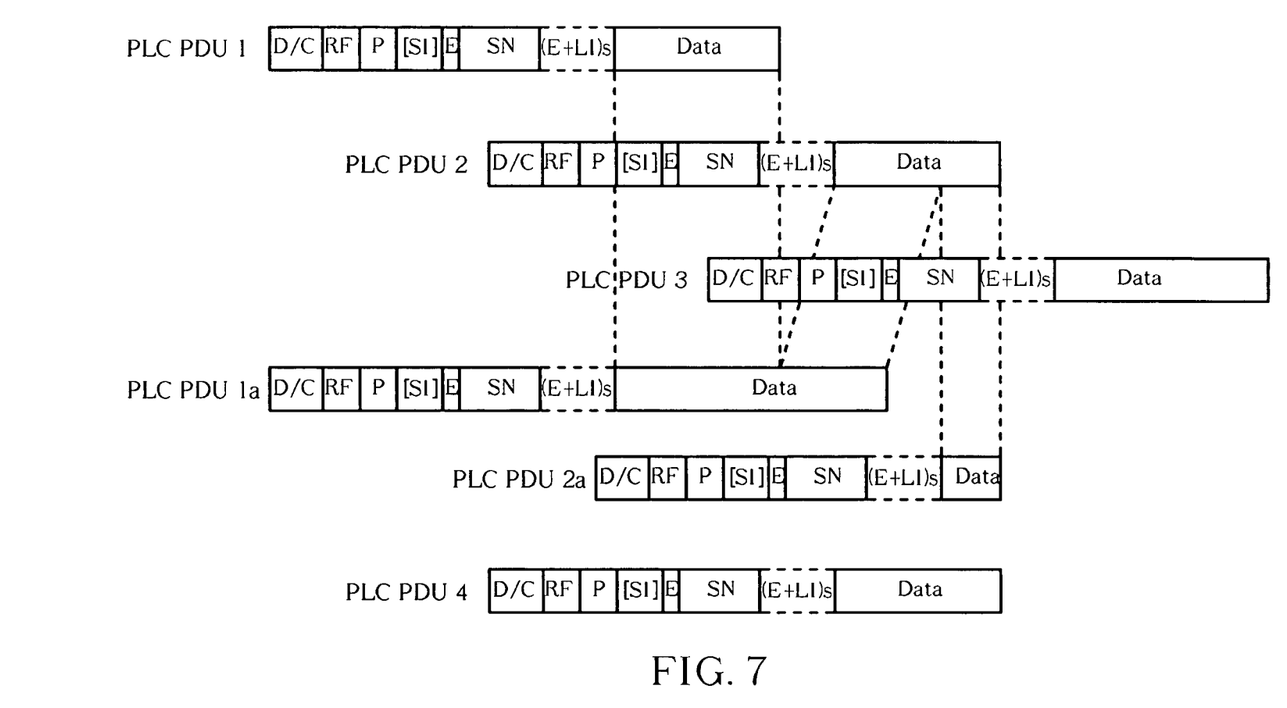

Please refer to FIG. 7, which illustrates a schematic diagram of RLC packets corresponding to retransmission according to an embodiment of the present invention. FIG. 7 makes an improvement upon the third example of the prior art corresponding to FIG. 2. The RLC PDUs 1, 2 and 3 are transmitted, and the RLC PDUs 1 and 2 are negatively acknowledged. An RLC PDU 4 is a new PDU that has not been transmitted to the receiver yet. At the TTI for retransmission, the TB size can afford the RLC PDU 1 and also partial data of the RLC PDU 2. In this situation, an RLC PDU 1a is constructed according to the TB size, and the data field thereof is filled to the full with the whole data of the RLC PDU 1 and the partial data of the RLC PDU 2. Preferably, the RLC PDU 1a fits the TB size. In next TTI accompanied with a new TB size, an RLC PDU 2a is constructed according to the new TB size for the remaining data of the RLC PDU 2. Preferably, the RLC PDU 2a fits the new TB size. If the new TB size has a capacity not only for the RLC PDU 2a but also for the RLC PDU 4, the RLC PDU 4 is also transmitted with the RLC PDU 2a. As can be seen from the above, the concepts of the processes 40 and 50 are both used in this embodiment. Therefore, the embodiment of the present invention can utilize as many radio resources as possible.

Consider an embodiment similar to the above one, the difference is that the TB size can afford the whole data of the RLC PDUs 1 and 2. In this situation, the transmitter constructs an RLC PDU with the sequence number (SN) of the RLC PDU 1. The RLC PDU includes the whole data of the RLC PDUs 1 and 2 at the first TTI for retransmission. Besides, the transmitter also constructs another RLC PDU with the SN of the RLC PDU 2 at the next TTI, and the RLC PDU includes no data but a header.

Consider another embodiment of the present invention making an improvement upon the fourth example of the prior art corresponding to FIG. 2. The RLC PDUs 1 and 2 respectively include data of 500 and 100 bytes, and the data thereof needs to be retransmitted. The TB sizes corresponding to two consecutive TTIs provide data allowances of 100 and 500 bytes for retransmission, respectively. In this situation, the transmitter constructs an RLC PDU 1a according to the former TB size, fits the former TB size in this embodiment, and fills the RLC PDU 1a with 100-byte data of the RLC PDU 1, as can also be shown by FIG. 7. The transmitter then constructs an RLC PDU 2a according to the latter TB size, fits the latter TB size in this embodiment, and fills the RLC PDU 2a with 500-byte data including the remaining 400-byte data of the RLC PDU 1 and the 100-byte data of the RLC PDU 2. Therefore, this embodiment fully utilizes radio resources and reduces time for retransmission of the RLC PDU 2.

For the above embodiment, the process 50 provides an alternative, which is choosing the RLC PDU 2 (100-byte data) for retransmission at the former TTI (100-byte data) and the RLC PDU 1 (500-byte data) is then retransmitted at the latter TTI (500-byte data). This avoids unnecessary RLC PDU re-segmentation.

Figure 8:
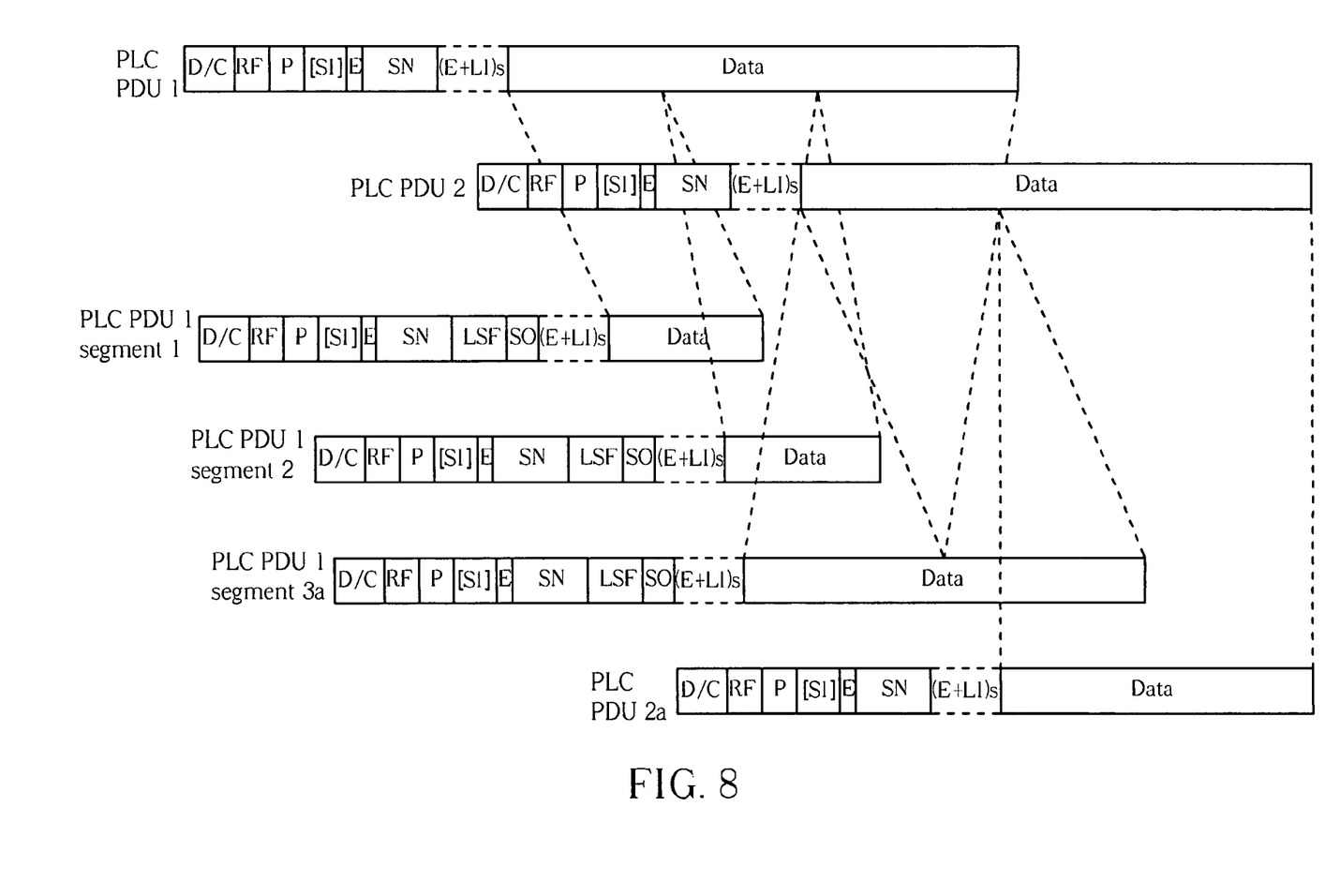

Please refer to FIG. 8, which illustrates a schematic diagram of RLC packets corresponding to retransmission according to an embodiment of the present invention. FIG. 8 makes an improvement upon the fifth example of the prior art corresponding to FIG. 3. The RLC PDUs 1 and 2 are both negatively acknowledged, and the RLC PDU 1 is segmented into RLC PDU 1 segments 1, 2 and 3 due to TB sizes for the RLC PDU 1 segments 1 and 2. In the transmission opportunity for the RLC PDU 1 segment 3, the TB size provides a greater capacity than the size of the RLC PDU 1 segment 3. Instead of directly retransmitting the RLC PDU 1 segment 3, the transmitter constructs a new RLC PDU 1 segment 3a according to the TB size, and the RLC PDU 1 segment 3a includes the whole data of the RLC PDU 1 segment 3 and partial data of the RLC PDU 2. Preferably, the RLC PDU 1 segment 3a fits the TB size. At next TTI, if allowed by the TB size, the transmitter constructs an RLC PDU 2a with the remaining data of the RLC PDU2. In this embodiment, one RLC PDU segment header is saved.

The method of the present embodiment can also be embodied as computer program product on a computer readable recording medium. The computer readable recording medium is any data storage device that can store data which can be thereafter read by a processor of a computer system, such as the above-mentioned UE, UTRAN or Node-B. Examples of the computer readable recording medium include read-only memory (ROM), random-access memory (RAM), CD-ROMs, magnetic tapes, floppy disks, optical data storage devices, and carrier waves (such as data transmission through the Internet).

Please note that the header contents of the RLC PDUs and RLC PDU segments are just used for embodiments and should not be used to limit the scope of the present invention. Beside, the header fields can be arranged with different orders.

In summary, the embodiments of the present invention provides methods aiming to utilize as much space allowed in the TB size for retransmission as possible, so as to fully utilize radio resources and reduce time for retransmission of packet data.

Those skilled in the art will readily observe that numerous modifications and alterations of the device and method may be made while retaining the teachings of the invention.

What is claimed is:

1. A method for dynamic packet retransmissions of a radio link control, hereinafter called RLC, layer for an RLC entity of a transmitter in a wireless communications system, the method comprising:
   transmitting a first RLC packet, comprising a first header and a first data field, to a receiver;
   receiving a negative acknowledgment signal corresponding to the first RLC packet from the receiver;
   receiving a first transport block, hereinafter called TB, size indicated by a protocol layer lower than the RLC layer;
   constructing a second RLC packet comprising a second header and a second data field filled to the full with partial data of the first data field, wherein the packet size of the second RLC packet depends on the first TB size;
   transmitting the second RLC packet to the receiver;
   receiving a second TB size indicated by the protocol layer lower than the RLC layer;
   constructing a third RLC packet comprising a third header and a third data field comprising data of the first data field that is not included in the second data field, wherein the packet size of the third RLC packet depends on the second TB size; and
   transmitting the third RLC packet to the receiver;
   wherein if the third data field is not filled to the full with the data of the first data field that is not included in the second data field, the third data field further comprises a portion of data of a fourth RLC packet that is also negatively acknowledged by the receiver.

2. The method of claim 1, wherein the second RLC packet fits the first TB size.

3. The method of claim 1, wherein the third RLC packet fits the second TB size.

4. The method of claim 1, wherein the first RLC packet and the fourth RLC packet are an RLC protocol data unit, hereinafter called PDU, and the second RLC packet and the third RLC packet are an RLC PDU or an RLC PDU segment.

5. The method of claim 1, wherein the transmitter is a Node-B or a UMTS terrestrial radio access network, hereinafter called UTRAN, of a long-term evolution, hereinafter called LTE, system when the receiver is a user equipment, hereinafter called UE, of the LTE system, or the transmitter is the UE when the receiver is the UTRAN or the Node-B.

6. A non-transitory computer readable medium arranged for causing a processor to execute the method of claim 1.

7. A method for dynamic packet retransmissions of a radio link control, hereinafter called RLC, layer for an RLC entity of a transmitter in a wireless communications system, the method comprising:
   transmitting a first RLC packet, comprising a first header and a first data field, to a receiver;
   receiving a negative acknowledgment signal corresponding to the first RLC packet from the receiver;
   receiving a first transport block, hereinafter called TB, size indicated by a protocol layer lower than the RLC layer;
   constructing a second RLC packet comprising a second header and a second data field comprising whole data of the first data field, wherein the packet size of the second RLC packet depends on the first TB size; and
   transmitting the second RLC packet to the receiver;
   wherein the second data field further comprises a portion of data of a third RLC packet, negatively acknowledged by the receiver, when the second data field has the greater capacity than the first data field does.

8. The method of claim 7, wherein the first RLC packet, the second RLC packet and the fourth RLC packet are an RLC PDU segment, and the first RLC packet and the second RLC packet are the RLC PDU segments corresponding to a same RLC PDU.

9. The method of claim 7, wherein the second RLC packet is an RLC PDU if the first RLC packet and the third RLC packet are all RLC PDU segments segmented from the RLC PDU and the second data field accommodates the data of the first RLC packet and the data of the third RLC packet.

10. The method of claim 7 further comprising:
    receiving a second TB size indicated by the protocol layer lower than the RLC layer;
    constructing a fourth RLC packet; and
    transmitting the fourth RLC packet to the receiver.

11. The method of claim 10, wherein the fourth RLC packet comprises a fourth header and a fourth data field comprising the data of the third data field that is not included in the second data field.

12. The method of claim 11 further comprising transmitting a fifth RLC packet that has not been transmitted to the receiver yet if the second TB size has enough capacity for the fourth RLC packet and the fifth RLC packet.

13. The method of claim 12, wherein the second RLC packet and the fourth RLC packet are an RLC PDU when the first RLC packet and the third RLC packet are an RLC PDU, or an RLC PDU segment when the first RLC packet and the third RLC packet are an RLC PDU segment, and the fifth RLC packet is an RLC PDU.

14. The method of claim 10, wherein the fourth RLC packet is an RLC PDU header if the second data field accommodates the data of the first RLC packet and the data of the third RLC packet.

15. The method of claim 14, wherein the first RLC packet, the second RLC packet, the third RLC packet and the fourth RLC packet are an RLC PDU.

16. A method for dynamic packet retransmissions of a radio link control, hereinafter called RLC, layer for an RLC entity of a transmitter in a wireless communications system, the method comprising:

transmitting a plurality of RLC packets to a receiver;
receiving a negative acknowledgment signal corresponding to the plurality of RLC packets from the receiver;
receiving a transport block size provided by a protocol layer lower than the RLC layer;
selecting a first RLC packet, whose packet size mostly fits the transport block size, from the plurality of RLC packets; and
transmitting the first RLC packet to the receiver in a transmission opportunity.

17. The method of claim 16 further comprising:
after the first RLC packet is selected, selecting a second RLC packet, whose packet size mostly fits the remaining space of the transport block size, from the plurality of RLC packets; and
transmitting the second RLC packet to the receiver in the transmission opportunity.

18. The method of claim 16, wherein the plurality of RLC packets are all RLC PDU or RLC PDU segments.

19. The method of claim 16, wherein the transmission opportunity is a transmission time interval for retransmission.

20. The method of claim 16, wherein the transmitter is a Node-B or a UMTS terrestrial radio access network, hereinafter called UTRAN, of a long-term evolution, hereinafter called LTE, system when the receiver is a user equipment, hereinafter called UE, of the LTE system, or the transmitter is the UE when the receiver is the UTRAN or the Node-B.

21. A non-transitory computer readable medium arranged for causing a processor to execute the method of claim 16.

* * * * *